(12) United States Patent
Nicholas

(10) Patent No.: US 7,100,062 B2
(45) Date of Patent: Aug. 29, 2006

(54) POWER MANAGEMENT CONTROLLER AND METHOD

(75) Inventor: Ken Nicholas, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 10/352,726

(22) Filed: Jan. 28, 2003

(65) Prior Publication Data

US 2004/0148533 A1    Jul. 29, 2004

(51) Int. Cl.
G06F 13/14    (2006.01)
H04B 17/00    (2006.01)

(52) U.S. Cl. ............... 713/323; 713/320; 713/321; 713/322; 713/324; 713/300; 713/310; 713/330; 713/340

(58) Field of Classification Search ........ 713/320–324, 713/300, 310, 330, 340
See application file for complete search history.

(56) References Cited

U.S. PATENT DOCUMENTS

| | | | |
|---|---|---|---|
| 5,542,077 A | 7/1996 | Johnson et al. | |
| 5,708,816 A | 1/1998 | Culbert | |
| 5,710,930 A | 1/1998 | Laney et al. | |
| 5,974,552 A | 10/1999 | Lim et al. | |
| 5,983,073 A | 11/1999 | Ditzik | |
| 6,189,106 B1 * | 2/2001 | Anderson | 713/300 |
| 6,216,233 B1 | 4/2001 | Baweja | |
| 6,308,278 B1 | 10/2001 | Khouli et al. | |
| 6,314,522 B1 * | 11/2001 | Chu et al. | 713/322 |
| 6,338,113 B1 | 1/2002 | Kubo et al. | |
| 6,415,359 B1 | 7/2002 | Kimura et al. | |
| 6,442,701 B1 | 8/2002 | Hurd | |
| 6,473,607 B1 * | 10/2002 | Shohara et al. | 455/343.1 |
| 6,574,740 B1 * | 6/2003 | Odaohhara et al. | 713/323 |
| 6,654,895 B1 * | 11/2003 | Henkhaus et al. | 713/320 |
| 6,735,707 B1 * | 5/2004 | Kapil | 713/322 |
| 6,804,503 B1 * | 10/2004 | Shohara et al. | 455/343.4 |
| 6,845,456 B1 * | 1/2005 | Menezes et al. | 713/320 |
| 6,898,718 B1 * | 5/2005 | Morrow | 713/320 |
| 2001/0044286 A1 | 11/2001 | Watanabe | |
| 2002/0146985 A1 * | 10/2002 | Naden | 455/70 |
| 2003/0145242 A1 * | 7/2003 | Derocher et al. | 713/320 |

* cited by examiner

Primary Examiner—A. Elamin

(57) ABSTRACT

A power management controller for conserving power in a device implementing power conservation states and a calendar-scheduler is disclosed. The calendar-scheduler records calendar-based events with associated time-of-occurrences. The controller is constructed and arranged to determine a maximum duration of time the device can remain in a reduced-power state while insuring the device can perform operations associated with a calendar-based event when that event occurs.

29 Claims, 5 Drawing Sheets

POWER MANAGEMENT CONTROLLER AND METHOD

BACKGROUND

Personal computing has gone, and is still going, through radical changes. Vast increases in computing complexity and faster processing speeds are now available in smaller packages at lower cost. There is, however, a corresponding increase in power consumption to operate modern processor-based devices. This is particularly problematic in portable processor-based devices such as laptop computers and personal data assistants (PDAs) which cannot easily incorporate larger and/or heavier batteries. To extend battery life many such devices implement multiple power conservation states each having a different rate of power consumption, transitioning the device to lower power-consuming states when possible.

Unfortunately, device availability is reduced when the device assumes a state in which limited or no device operations can be performed. In addition, transitioning between certain states requires the performance of tasks that can take considerable time, further decreasing device availability. To avoid this latter loss of device availability, some conventional approaches retain data in processor memory. However, maintaining memory power can unnecessarily consume power, accelerating battery depletion.

SUMMARY

A method for conserving power in a processor-based device implementing power conservation states and a calendar-scheduler is disclosed. The calendar-scheduler records calendar-based events and associated time-of-occurrences. The method may comprise: receiving a time-of-occurrence for a calendar-based event, and determining whether the device is to be transitioned from a current state to a reduced-power state based on the received time-of-occurrence.

A power management controller for conserving power in a device implementing power conservation states and a calendar-scheduler is also disclosed. The calendar-scheduler records calendar-based events and associated time-of-occurrences. The controller may be constructed and arranged to determine a maximum duration of time the device can remain in a reduced-power state while insuring the device can perform operations associated with a calendar-based event when that event occurs.

A device implementing power conservation states and a calendar-scheduler that records calendar-based events with associated time-of-occurrences is also disclosed. The device may comprise: means for detecting indications of future device inactivity; and means for determining, when an indication of future device inactivity is detected, a maximum duration of time the device can remain in a reduced-power state while insuring the device can perform operations associated with a calendar-based event when that event occurs.

DETAILED DESCRIPTION

This disclosure, in general, describes systems and methods for use in devices implementing power conservation states and a calendar-scheduler that records calendar-based events and time at which the calendar-based events occur. A controller determines whether the device is to be transitioned from a current state to a state in which the device consumes power at a reduced rate, referred to herein as a reduced-power state, based on a time at which a calendar-based event is to occur. Typically, the controller makes such a determination in response to an indication of future device inactivity or other event warranting a transition to the reduced-power state. The time at which the device transitions from the reduced-power state to an operational power state is referred to as the time-to-revive. The time-to-revive may be determined to occur prior to a calendar-based event's time-of-occurrence to allow sufficient time to enable the device to transition to the destination operational state. Thus, anticipating that device operation is desired at the time of a calendar-based event, the controller may insure device operability prior to the event's time-of-occurrence. Such a controller may be particularly advantageous in personal data assistants (PDAs) and other portable processor-based devices hosting calendar-scheduler programs because it enables such devices to implement power conservation states to extend battery life while insuring the device can perform operations in connection with calendar-based events when those events occur.

Figure 1:
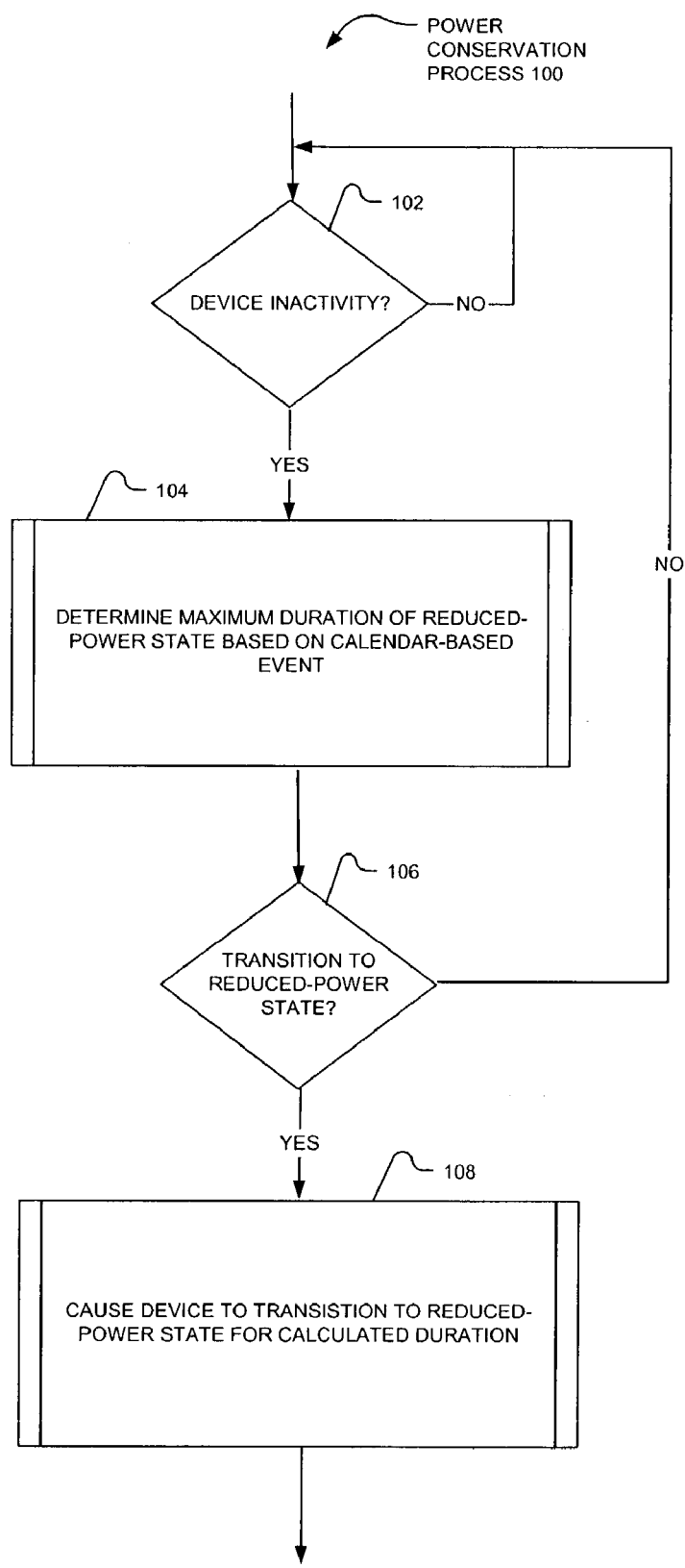
FIG. 1 is a flow chart of the operations performed in one embodiment of a power conservation process.

FIG. 1 is a flow chart of the operations performed in a power conservation process 100 of a device. At block 102 power conservation process 100 determines whether an indication of future device inactivity has been detected. Indications of future device inactivity can include, for example, a time duration during which user interface inputs are not received, and/or a time duration during which a device processor is not executing instructions. Additional exemplary indications of future device inactivity include an indication that the user has powered off the device, an indication that a display portion of the device has been closed, and other user actions indicating intended cessation of device use. In alternative embodiments, an error event and a low-battery power alarm can additionally or alternatively be considered. It should be appreciated by those of ordinary skill in the art that the above-noted indications of future device inactivity are exemplary only and that any combination of internal and external, scheduled and non-scheduled conditions, events, data or signals as an indication of future device inactivity can be received and interpreted by process 100.

If no such indication is received by power conservation process 100, the operations associated with block 102 are repeated. Otherwise, upon detection of such an indication, power conservation process 100 advances to block 104. To reduce the rate at which power is consumed during periods of device inactivity, it is desirable to have the device implement one or more power conservation states, and to transition the device to a reduced-power state at such times. A reduced-power state typically is attained by the removal of power from certain device components to achieve a desired power consumption. For example, commonly-implemented power conservation states often include a reduced-power state in which power is removed from the processor and its associated volatile memory in which executing programs and data are stored. When in such a reduced-power state all program execution is disabled, including the execution of the calendar-scheduler program, preventing the calendar-scheduler program from performing operations associated with calendar-based events as those events occur. At block 104, power conservation process 100 determines the maximum duration of time the device can remain in such a reduced-power state while insuring the device can perform operations associated with a calendar-based event when that event occurs.

Transitioning from a reduced-power state to an operational state often requires performance of a number of tasks to place the device in proper condition to perform operations associated with that operational state. These tasks are generally referred to herein as state transition tasks. For example, when transitioning from the above-noted reduced-power state to an operational state the operating system must be reloaded into memory and the device operating system rebooted. In addition, any data stored in volatile memory that was preserved in non-volatile memory must be returned to processor memory. These tasks can take anywhere from a few seconds to a several minutes, further delaying calendar-based event processing.

To prevent such a delay, the time-to-revive is determined to occur sufficiently prior to the event's time-of-occurrence to provide at least the requisite time for the device to attain the requisite operational capability to perform operations associated with the operational state in which the calendar-based events are to be processed. As an illustration, take the example in which the time-of-occurrence of a calendar-based event is determined to be one hour from the present time. The state transition tasks required to transition the device from a reduced-power state to an operational state suitable for processing the calendar-based event require two minutes to perform. The maximum time the device can remain in the reduced-power state while insuring the device can perform operations associated with the calendar-base event is 58 minutes (60 minutes–2 minutes), and the time-to-revive is set to occur at a time that is 58 minutes from the present time.

It should be appreciated that other approaches to calculating the maximum duration of the reduced-power state that reduces power consumption while insuring device operability prior to the event's time-of-occurrence can also be implemented. For example, in embodiments in which there are other software applications executing at the time the indication of future device inactivity occurs, the time-to-revive could be set to occur sooner than that determined above to allow for any such applications to be re-invoked and/or data associated with such applications to be copied to processor memory.

With regard to the calendar-based events, it should be appreciated that such events can be any event that has an associated time-of-occurrence. Calendar-based events can be recorded in memory using electronic calendar, appointment, scheduling, contact-management or other programs in which events are recorded with an associated time-of-occurrence. Such software programs, often referred to as calendar-scheduler programs, are commercially available and is commonly used. In the alternative or in addition, calendar-based events can be communicated to the device from external electronic sources as well, such as from networked scheduling programs, e-mail messages, and other external sources. All such sources of calendar-based events are generally referred to herein as a calendar-scheduler.

At block 106 power conservation process 100 determines whether the device should be transitioned to the reduced-power state given the calculated time-to-revive. For example, the calendar-based event may be so close to the present time that the event will occur prior to the device transitioning from the current state to the reduced-power state, and from the reduced-power state to the destination operational state. In other circumstances the resulting reduced-power state would be of such short duration that transitioning to the reduced-power state would conserve minimal power. In alternative embodiments other factors are considered. For example, when the battery of a portable processor-based device is below some threshold, even a minimal reduction in power consumption may be desirable. In such circumstances the device is transitioned to a reduced-power state even if the maximum time duration the device can remain in the reduced-power state is brief. It should be appreciated that other trade-offs with the same, additional or alternative factors can be considered at block 106.

If at block 106 an affirmative determination to transition to the reduced-power state has been made, power conservation process 100 advances to block 108 at which the device is instructed to transition to the reduced-power state until the calculated time-to-revive. When integrated with a power management controller that controls device transitions between the power conservation states, appropriate operations are performed by the power management controller to cause the device to transition to and from the reduced-power state. Such operations are dependent on the implemented power conservation states, and can include, but are not limited to, removing and applying power from device components, transferring data between volatile and non-volatile memory, and rebooting the device operating system.

On the other hand, if at block 106 power conservation process 100 determines that the device should not be transitioned to the reduced-power state despite the detected indication of future device inactivity, processing returns to blocks 102 and the above operations are repeated. In alternative embodiments, additional operations can be performed. For example, if the indication of future device inactivity is a user command or action, power conservation process 100 can include performing certain operations to notify the user when such a request cannot be honored.

Figure 2A:
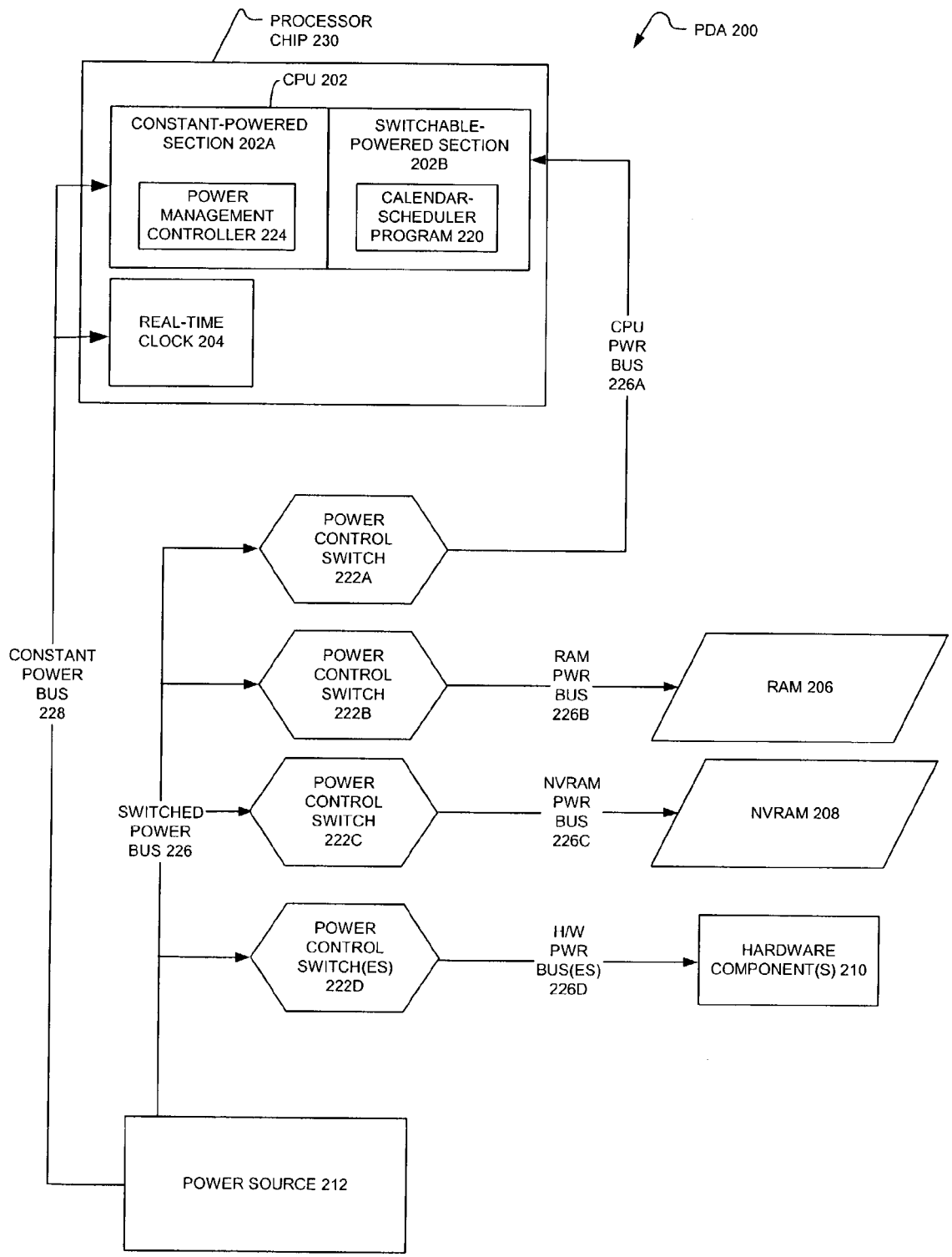
FIG. 2A is a diagram illustrating the power bus architecture of one exemplary device suitable for implementing operations to effect power conservation state transitions.
Figure 2B:
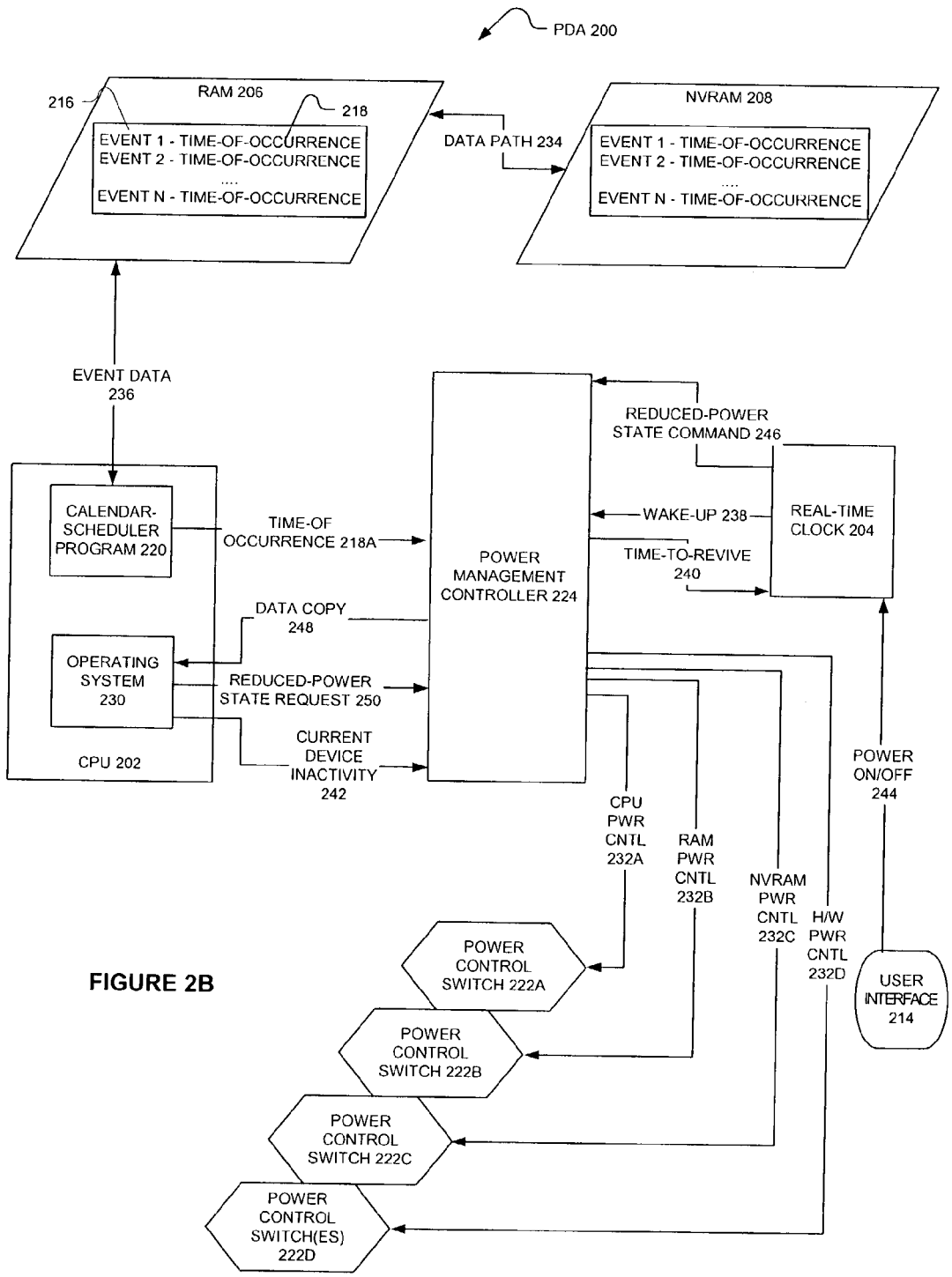
FIG. 2B is a block diagram illustrating the interfaces between one embodiment of a power management controller and other components of an exemplary host device.

Embodiments of the present invention are described below in the context of a personal data assistant (PDA) implementing a calendar-scheduler software program. FIG. 2A is a high-level block diagram showing a power distribution architecture of an exemplary PDA 200 implementing one embodiment of a power management controller of the present invention. FIG. 2B is an interface block diagram of the power management controller illustrated in FIG. 2A. In FIGS. 2A and 2B only relevant portions of PDA 200 are illustrated to simply the figures; other hardware and software components of PDA 200 are not shown.

PDA 200 primarily includes a central processing unit (CPU) 202, a real-time clock (RTC) 204, random access memory (RAM) 206, and non-volatile random access memory (NVRAM) 208. CPU 202 can be virtually any processor or microprocessor chip or chip set that executes computer instructions. In one embodiment, CPU 202 is of a low-voltage variety which is commonly used in portable computing devices such as laptop computers and PDAs. In other embodiments, CPU 202 can be implemented as an application specific integrated circuit (ASIC), programmable logic array (PLA) or other device capable of executing computer or recorded digital instructions.

Real-time clock 204 generates what is commonly referred to as a wake-up signal 238 to initiate a reboot sequence when PDA 200 is initially powered. In devices implementing power conservation states, such a wake-up signal 238 is typically generated to load the operating system when PDA 200 transitions into a state requiring an operational processor from a state in which the processor and/or its associated memory is/are not powered. In the embodiment shown in FIG. 2B, real-time clock 204 generates wake-up signal 238 which is received and processed by power management controller 224 as described below. Real-time clock 204 generates wake-up signal 238 at a time-to-revive 240 generated by power management controller 224. As one of ordinary skill in the art would appreciate, real-time clock 204 can generate wake-up signal 238 based on other factors. For example, in the embodiment shown in FIG. 2B, real-time clock 204 also generates wake-up signal 238 in response to receipt of a power-on signal 244 from a user interface 214 of PDA 200. As shown in FIG. 2B, real-time clock 204 also generates a reduced-power state command 246 instructing power management controller 224 to transition immediately into the reduced-power state. Such a command may be issued in response to a signal 244 indicating the occurrence of a user request or other action requiring PDA 200 to transition to the reduced-power state. Real-time clock 204 can be any real-time clock now or later developed, whether stand-alone devices or those integrated with processors or other components.

RAM 206 comprises one or more memory devices suitable for storing data for CPU 202. RAM 206 is effective to store event data 236 generated by a calendar-scheduler program 220 executing in CPU 202. Event data 236 comprises calendar-based events 216 and associated time-of-occurrences 218. RAM 206 can be, for example, a dynamic random-access memory (DRAM) or any other volatile memory device now or later developed. In one embodiment, RAM 206 comprises multiple banks of memory, such as a memory assembly, although a single-chip RAM can be used as well.

NVRAM 208 is directly or indirectly coupled with RAM 206 via a data path 234 and can be a wide variety of types and sizes. NVRAM 208 is adapted to store information that can be stored in RAM 206, but need not store that information in the same configuration, sequence, or format. In one embodiment, NVRAM 208 can be an external disk drive, a conventional EEPROM, Flash-memory, or other storage device capable of retaining information in the absence of power.

PDA 200 is powered by a power source 212. In this exemplary application of a portable processor-based device, power source 212 can be a non-rechargeable or rechargeable battery. It should be appreciated that power source 212 can be of an adapter configuration such as a conventional AC-adapter or car adapter, as known in the art. In one embodiment, power source 212 is an external power source.

Referring to the power architecture illustrated in FIG. 2A, the distribution of power provided by power source 212 is effected through two power buses, a constant power bus 228 and a switched power bus 226. Switched power bus 226 provides power to each power-consuming component of PDA 200 via a plurality of individual power buses 226A–226D. Power control switches 222A–222D each selectively couple switched power bus 226 to each component power bus 226A–226D. For example, power control switch 222A selectively couples power to CPU 202 via CPU power bus 226A; power control switch 222B selectively couples power to RAM 206 via RAM power bus 226B; power control switch 222C selectively couples power to NVRAM 208 via NVRAM power bus 226C. Additionally, one or more power control switch(es) 222D selectively couple(s) power to other hardware component(s) 210 of PDA 200 via power bus(es) 226D.

Referring to FIG. 2B, power management controller 224 generates a CPU power control signal 232A to control the state of power control switch 222A. Similarly, power management controller 224 controls the remaining power control switches 222B–222D with power control signals 232B–232D, respectively. In the illustrative embodiment, power control switches 222 are implemented as FETs although any controllable power switch suitably rated to switch power provided by the implemented power source 212 can be used. In alternative embodiments, one or more power switches 222 can be integrated into the power-consuming or other component of PDA 200, such as CPU 202 or power source 212.

Returning to FIG. 2A, the illustrative PDA 200 comprises a single processor chip 230 having an integrated real-time clock 204 and CPU 202. CPU 202 is divided into constant-powered section 202A and switchable-powered section 202B, each having a dedicated power input. In this embodiment, power management controller 224 is a software program that executes in constant-powered section 202A while calendar-scheduler program 220 executes in switchable-powered section 202B. Constant power bus 228 provides constant power to real-time clock 204 and constant-powered CPU section 202A. Switchable-powered section 204B of CPU 202 receives power via switched power bus 226, as described above.

As noted, power management controller 224 determines time-to-revive 240 based on a time-of-occurrence 218A associated with a calendar-based event 216. The associated time-of-occurrence 218A is retrieved from RAM 206 by calendar-scheduler program 220 and provided to power management controller 224. Power management controller 224 utilizes the requested time-of-occurrence 218A as described below.

An operating system 230 also executes on CPU 202. Operating system 230 provides power management controller 224 with an indication of current device inactivity 242. As noted, current device inactivity is considered in certain embodiments of power management controller 224 when determining whether there is an indication of future device inactivity. As will be described in detail below, when transitioning to a reduced-power state in which power is removed from RAM 206, the data currently stored in RAM 206 will be permanently lost unless preserved. The preservation of RAM data is achieved through the conventional technique of transferring the data between RAM 206 and NVRAM 208, as noted above. Power management controller 224 effects such data transfers by issuing a data copy command 248 to operating system 230. As one of ordinary skill in the art would find apparent, data copy command 248 represents a wide variety of commands that invoke a data copy or data transfer between RAM 206 and NVRAM 208. For example, data copy command 248 can issue data transfer macros in operating system 230. In other embodiments, data copy command 248 effects bus transfers, DMA transfers, or other transfers as appropriate for the implementing operating system 230.

Figure 3:
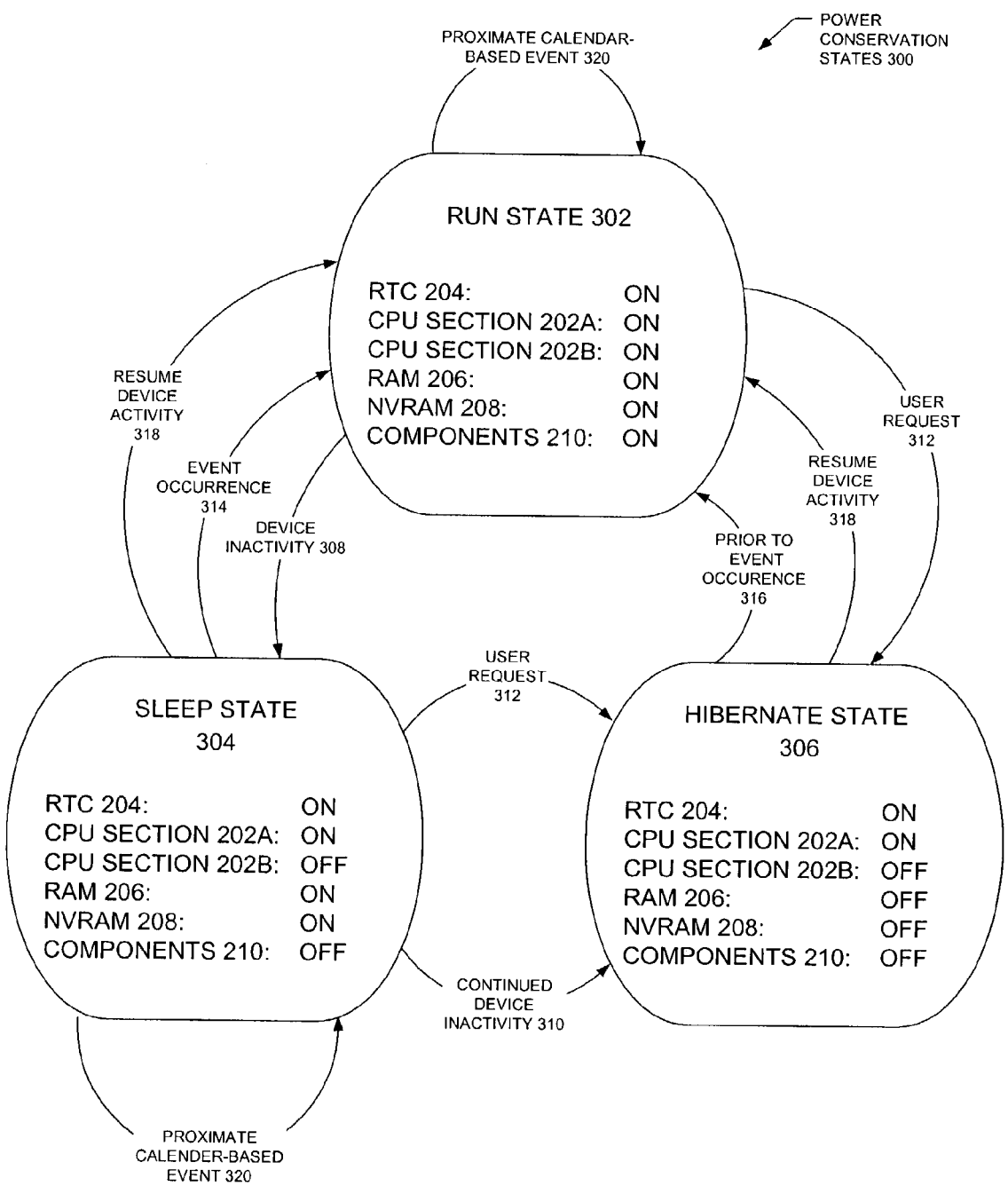
FIG. 3 is a state diagram showing power conservation states implemented in a processor-based device.

A more detailed description of various aspects and embodiments of the present invention are provided below in the context of a particular example. FIG. 3 is a state diagram illustrating exemplary power conservation states 300 implemented in one embodiment of PDA 200. In this exemplary application, power management controller 224 causes PDA 200 to transition between a run state 302, a sleep state 304 and a hibernate state 306. Each power state is characterized by a different rate of power consumption. Such variation in power consumption is achieved by selectively powering different combinations of components of PDA 200. In FIG. 3, the status of the power provided to each of the device components is set out within each illustrated power state. In other embodiments, variations in power consumption can be achieved through other approaches, such as selectively operating continuously-powered device components.

While in run state 302, PDA 200 is fully powered and operational. Run state 302 is characterized by power being applied to real-time clock 206, CPU sections 202A and 202B, RAM 206, NVRAM 208 and hardware components 210. In sleep state 304 only essential components of PDA 200 are powered to minimize power consumption while facilitating a rapid transition to the fully-operational run state 302. Specifically, power is provided to real-time clock 204, CPU Section 202A, RAM 206 and NVRAM 208. Power is removed from CPU section 202B and hardware components 210. By continuing to power RAM 206, operating system 230 and data need not be reloaded to transition to run state 302. When in hibernate state 306, PDA 200 is essentially powered off. Power is removed from all components other than real-time clock 204 and constant-powered CPU section 202A.

As will be described in detail below, in one embodiment of the invention, power management controller 224 determines the maximum time duration PDA 200 can remain in reduced-power states that require the performance of time-consuming state transition tasks to return to an operational state. For example, sleep state 304 does not require the performance of such time-consuming state transition tasks to return to run state 302. Hibernate state 306 is, therefore, the only reduced-power state for which the operations are performed in this embodiment of the invention. As one of ordinary skill in the art would find apparent, however, in other embodiments the time-to-revive from sleep state 304 may also be determined. In such embodiments, the time to transition from sleep state 304 to run state 302 is minimal for the reasons noted above. It should also be appreciated that the time-to-revive from other states assumed by PDA 200 could be determined as well.

As noted, power management controller 224 causes PDA 200 to transition to a reduced-power state in response to indications of future device inactivity. For ease of description, in this embodiment, indications of future device inactivity are limited to indications of current device inactivity and user requests. Power management controller 224 transitions PDA 200 from run state 302 to sleep state 304 in response to a first period of device inactivity illustrated in FIG. 3 as device inactivity condition 308. Should device inactivity continue for a second period of time, power management controller 224 causes PDA 200 to transition from sleep state 304 to hibernate state 306, illustrated in FIG. 3 as continued device inactivity condition 310. PDA 200 can also transition to hibernate state 306 from run state 302 and sleep state 304 in response to a user request or other action requiring transition to hibernate state 306. This is illustrated in FIG. 3 as user request condition 312.

In addition to removing power from components of PDA 200, transitioning to reduced-power states 304, 306 may also involve other state transition tasks. For example, when transitioning from run state 302 to hibernate state 306 data in RAM 206 is copied to NVRAM 208, and when transitioning from run state 203 to either sleep state 304 or hibernate state 306 power management controller 224 stores time-to-revive 240 with real-time clock 204. Similarly, transitioning from reduced-power states 304, 306 to run state 302 requires the performance of a number of tasks to place PDA 200 in the proper condition to perform operations associated with run state 302. For example, when transitioning from sleep state 304 to run state 302, power must be restored to CPU 202 and hardware components 210. Because rebooting and data transfer operations need not be performed to effect this transition, device functionality is restored rapidly. Thus, this transition occurs at the time-of-occurrence of the calendar-based event, represented in FIG. 3 by event occurrence condition 314.

In contrast, when transitioning from hibernate state 306 to run state 302 time-consuming state transition tasks must be performed. In addition to restoring power to device components, operating system 230 is reloaded into RAM 206 and data previously stored in NVRAM 208 is copied back into RAM 206, and PDA 200 is rebooted. As noted, these tasks take time. To account for the concomitant unavailability to process calendar-based events, this state transition occurs at the calculated time-to-revive 240. As noted, time-to-revive 240 is calculated to be sufficiently prior to the time of occurrence of the calendar-based event to enable such state transition tasks to occur; that is, to enable the device to attain the requisite operational capability to perform run state operations. This condition is represented in FIG. 3 as prior to event occurrence condition 316. Alternatively, PDA 200 can transition from sleep state 304 and hibernate state 306 to run state 302 when device activity resumes. This is illustrated in FIG. 3 by resume device activity condition 318.

As noted above, a determination of whether PDA 200 should transition to hibernate state 306 is made given the calculated time-to-revive and other factors. Should state module 404 determine that it cannot transition to hibernate state 306, it remains in the current state 302, 302, as illustrated by proximate calendar-based condition 320 even.

Figure 4:
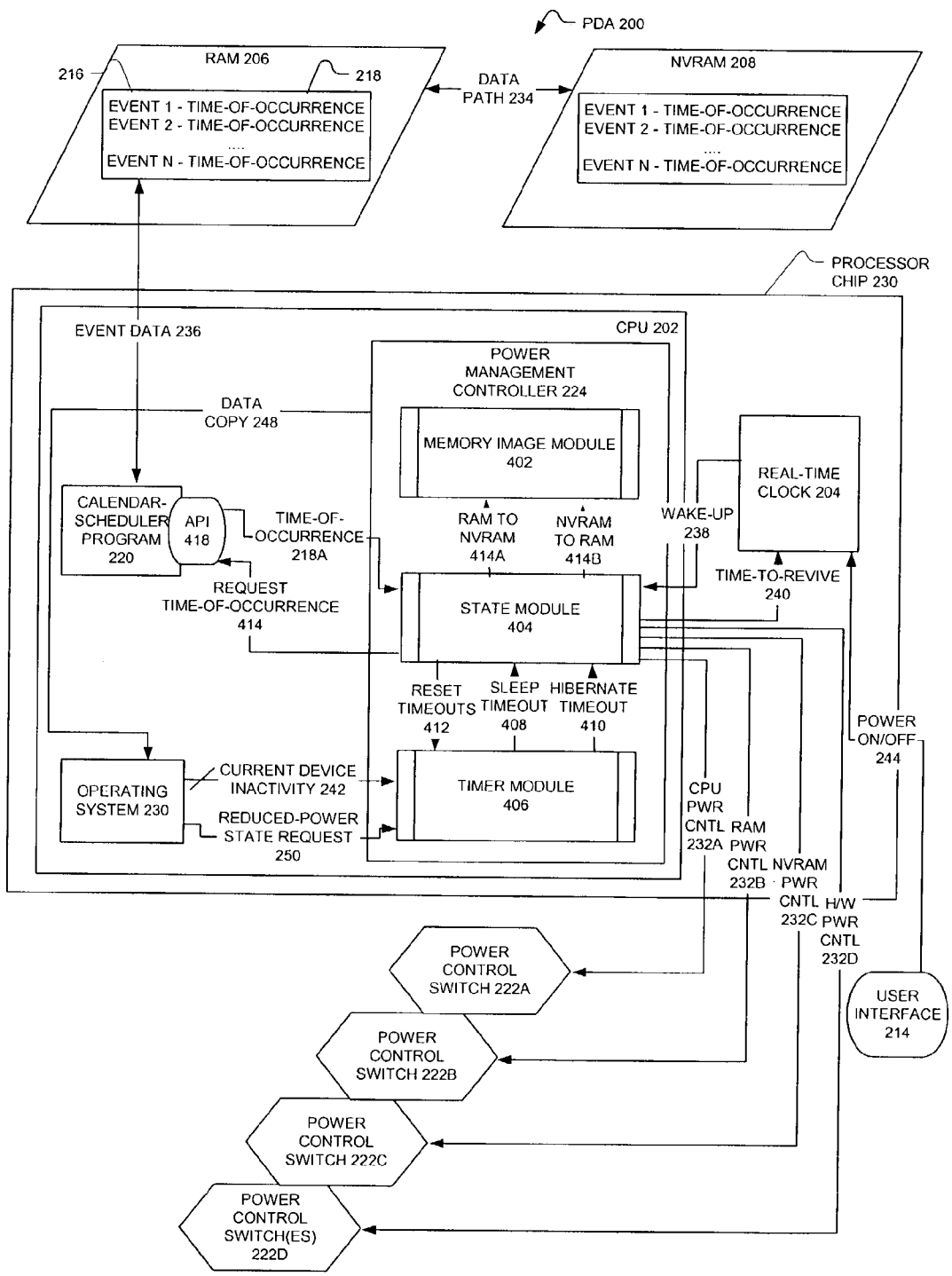
FIG. 4 is a detailed block diagram of the power management controller illustrated in FIGS. 2A–2B.

FIG. 4 is a functional block diagram of one embodiment of power management controller 224 implemented in PDA 200. In this illustrative embodiment, power management controller 224 is a software application executing, for example, as a background daemon or on a priority interrupt basis. In one embodiment, power management controller 224 is merged into operating system 230 and can be periodically activated, or activated only during periods of device inactivity. Alternatively, power management controller 224 can be implemented in hardware, such as an ASIC or PLA. Further, output signals from power management controller 224 can be implemented in hardware or software, or any combination thereof.

Power management controller 224 primarily includes a memory image module 402, a state module 404 and a timer module 406. Timer module 406 monitors system activity and generates one or more signals each representing the noted device inactivity conditions 308, 310. Memory image module 402 effects data transfer between RAM 206 and NVRAM 208 to preserve data when power is removed from RAM 206, and to restore data to RAM 206 when power is restored. State module 404 determines the maximum time PDA 200 can remain in hibernate state 306 based on time-of-occurrence 218A of a calendar-based event, and the time required for PDA 200 to attain a requisite operational capability associated with run state 302. Each of these functional elements of this embodiment of power management controller 224 is described below.

Timer module 406 measures the duration of periods of current device inactivity. As noted, power management controller 224 transitions PDA 200 from run state 302 to sleep state 304 upon detecting device inactivity condition 308, and from sleep state 304 to hibernate state 306 upon detecting continued device inactivity condition 310. Timer module 406 can receive indications of current device activity from various sources in PDA 200. In this embodiment, timer module 406 receives all such information from operating system 230 via current device inactivity 242.

Timer module 406 preferably implements one or more timers each measuring a period of device inactivity. In this exemplary application, a single timer is implemented in timer module 406 to measure the two noted consecutive periods of device inactivity. The timer compares a first detected period of device inactivity to a first threshold representing device inactivity condition 308, generating a sleep timeout signal 408 when the first threshold is exceeded. The timer compares a next successive period of device inactivity to a second threshold representing continued device inactivity condition 310, generating a hibernate timeout signal 410 when the second threshold is exceeded.

A reset timeout signal 412 can be received by timer module 406 causing the implemented timer(s) to reset to an initial state. For example, when a resume device activity condition 318 occurs, the timer(s) is/are reset to an initial state. In one embodiment, the threshold time periods are programmable. For example, the first and second thresholds may be set based on the type or capacity of an power source 212.

Memory image module 402 is coupled to state module 404, and is adapted to effect data transfer between RAM 206 and NVRAM 208 in response to control signals generated by state module 404. State module 404 generates data transfer control signal 414A requesting data be transferred from RAM 206 to NVRAM 208. Similarly, state module 404 generates data transfer control signal 414B requesting data be transferred from NVRAM 208 to RAM 206. Memory image module 402 issues data copy command 248 to operating system 230 to transfer data in accordance with control signals 414.

State module 404 effects transitions of PDA 200 between the noted power consumption states 302-306. In response to sleep-timeout signal 408, state module 404 sends a request 416 to calendar-schedule program 220 for time-of-occurrence 218A for the next-occurring calendar-based event 216. The interface of calendar-schedule program 220 is implemented, in this embodiment, as an application program interface (API) 418. API 418 receives request 416 and returns the requested time-of-occurrence 218A. As noted, any calendar-based event 216 can be used to calculate time-to-revive 240. In this exemplary embodiment, the calendar-based event 216 is the next-occurring event recorded by calendar-scheduler program 220. State module 404 then generates power control signals 232 to effect a desired power configuration for sleep state 304, as described above with reference to FIG. 3.

While in sleep state 304, several conditions can cause state module 404 to transition PDA 200 to run state 402, as noted above. One such condition is when the requested time-of-occurrence 218A becomes the present time. Another condition is the resumption of device activity condition 318. If either of these conditions occur, state module 404 restores power to the un-powered components 202, 210, through the issuance of power control signals 232A, 232D, respectively, effecting the transition of PDA 200 to run state 302.

Upon receipt of hibernate timeout signal 410 or reduced-power state request 250 indicating a user request to hibernate, state module 404 effects a transition to hibernate state 306. State module 404 first determines whether transitioning to hibernate state 306 can be effected based on the calendar-based event. State module 404 determines the maximum time PDA 200 can remain in hibernate state 306 by subtracting from requested time-of-occurrence 418A the time required for PDA 200 to perform the state transition tasks associated with transitioning from hibernate state 306 to run state 302. This latter time can be programmed in state module 404, stored in an accessible memory location or otherwise made available to state module 404. The resulting time-to-revive 240 is compared to the present time to determine the maximum duration PDA 200 can remain in hibernate state 306. As noted above, a determination of whether PDA 200 should transition to hibernate state 306 is made given the calculated time-to-revive and other factors.

Should state module 404 determine that it cannot transition to hibernate state 306, it remains in the current state 302, 304, as illustrated by proximate calendar-based condition 320 event. Otherwise, state module 404 provides the calculated time-to-revive 240 to real-time clock 204. Real-time clock 204 stores time-to-revive 240 for future use when in hibernate state 306. State module 404 also issues copy RAM-to-NVRAM signal 414A to memory image module 402 to preserve the data stored in RAM 206. State module 404 then generates power control signals 232B and 232C to remove power from the remaining powered components of PDA 200; that is, RAM 206 and NVRAM 208. These operations effect state transition to hibernate state 306.

Transitioning from hibernate state 306 to run state 302 occurs in response to the receipt of wake-up signal 238 generated by real-time clock 204. As noted, real-time clock 204 generates wake-up signal 238 at the time indicated in the stored time-to-revive 240, or in response to a user request 244. In response to wake-up signal 238, state module 404 generates power control signals 232 to restore power to all un-powered components of PDA 200. A conventional boot sequence then occurs. State module 404 then sends a copy NVRAM-to-RAM control signal 414B to memory image module 402 which causes data in NVRAM 208 to be copied to RAM 206. These operations effect a state transition from hibernate state 306 to run state 302.

While various embodiments of the present invention have been described above, it should be understood that they have been presented by way of example only, and not limitation. For example, it will be understood by those skilled in the art that systems, control and data flows between and among components and functional elements of the invention and various data structures may vary in many ways from the control and data flows described above. More particularly, intermediary functional elements (not shown) may direct control or data flows; the functions of various element may be combined, divided, or otherwise rearranged to all parallel processing or for other reasons; intermediate data structures may be used; various described components and modules may be combined; the sequencing of functions or portions of functions generally may be altered; and so on. Numerous other embodiments, and modifications thereof, are contemplated as falling with the scope of the present invention and defined by appended claims and equivalents thereto. Thus, the breadth and scope of the present invention should not be limited by any of the above described exemplary embodi-

What is claimed is:

1. A method for conserving power in a processor-based device implementing power conservation states and a calendar-scheduler that records calendar-based events and associated time-of-occurrences, the method comprising:
    detecting an indication regarding inactivity of the processor-based device;
    transmitting, in response to the indication, a request for a time-of-occurrence for a calendar-based event;
    receiving, in response to the request, a time-of-occurrence for a calendar-based event; and
    determining, based on the received time-of-occurrence, a maximum duration of time the device can remain in a reduced-power state while insuring the device can perform operations associated with the calendar-based event.

2. The method of claim 1, further comprising:
    determining a time at which the device is to transition from the reduced-power state to an operational state to process the calendar-based event, said time being a time prior to the received time-of-occurrence.

3. The method of claim 2, wherein determining a time at which the device is to transition from the reduced-power state to the operational state comprises:
    calculating the time at which the device is to transition from the reduced-power state to the operational state to be a time sufficiently prior to the received time-of-occurrence to enable the device to attain a requisite operational capability associated with the operational state.

4. The method of claim 1, further comprising:
    determining whether the device is to be transitioned from a current state to a reduced-power state in response to detecting the indication of device inactivity.

5. The method of claim 4, wherein indications of future device inactivity comprise one or more of the group consisting of:
    a time duration during which an input through a user interface is not received;
    a time duration during which the processor is not executing instructions;
    a user command to powering off the device;
    a closing or un-powering of a display portion of the device;
    an occurrence of one or more error events; and
    a low-battery power alarm.

6. The method of claim 2, wherein determining a time at which the device is to transition from the reduced-power state to an operational state further comprises:
    determining whether there is sufficient time for the device to remain in the reduced-power state based on one or more factors comprising a difference between the time-to-revive and the present time.

7. The method of claim 2, further comprising:
    determining whether the device is to be transitioned from a current state to a reduced-power state; and
    wherein, when an affirmative determination has been made to transition the device from a current state to a reduced-power state, the method further comprises:
    instructing the device to transition to the reduced-power state until the time determined to transition the device from the reduced-power state to the operational state.

8. The method of claim 7, wherein the method further comprises:
    performing operations to cause the device to transition to the reduced-power state.

9. The method of claim 8, wherein performing operations to cause the device to transition to the reduced-power state comprises:
    removing power from device components;
    transferring data between volatile and non-volatile memory; and
    rebooting the device operating system.

10. The method of claim 1, wherein the device is a personal data assistant.

11. An apparatus comprising:
    a power management controller for conserving power in a device implementing power conservation states and a calendar-scheduler that records calendar-based events and associated time-of-occurrences, wherein the controller is constructed and arranged to detect an indication regarding inactivity of the processor-based device, transmit, in response to the indication, a request for a time-of-occurrence for a calendar-based event, receive, in response to the request, a time-of-occurrence for a calendar-based event, and determine, based on the received time-of-occurrence, a maximum duration of time the device can remain in a reduced-power state while insuring the device can perform operations associated with the calendar-based event when that event occurs.

12. The apparatus of claim 11, wherein the power management controller determines a time at which the device is to transition from the reduced-power state to an operational state to perform the operations associated with the calendar-based event to be a time prior to the calendar-based event's time-of-occurrence.

13. The apparatus of claim 12, wherein the power management controller calculates the time at which the device is to transition from the reduced-power state to the operational state to be a time sufficiently prior to the received time-of-occurrence to enable the device to attain a requisite operational capability associated with the operational state.

14. The apparatus of claim 11, wherein the power management controller comprises:
    a timer module configured to detect and measure periods of device inactivity,
    wherein the power management controller in detecting an indication regarding inactivity of the processor-based device, is further configured to detect an indication of inactivity provided by the timer module.

15. The apparatus of claim 14, wherein indications of future device inactivity comprise one or more of the group consisting of:
    a time duration during which an input through a user interface is not received;
    a time duration during which the processor is not executing instructions;
    a user command to powering off the device;
    a closing or un-powering of a display portion of the device;
    an occurrence of one or more error events; and
    a low-battery power alarm.

16. The apparatus of claim 12, wherein the power management controller further comprising:
    a state module configured to determine whether there is sufficient time for the device to remain in the reduced-power state based on one or more factors comprising a difference between the time-to-revive and the present time.

17. The apparatus of claim 11, wherein, when transiting the device to transition to the reduced-power state, the state module generates instructions to the device to transition to the reduced-power state until the time determined to transition the device from the reduced-power state to the operational state.

18. The apparatus of claim 17, wherein the power management controller is further configured to perform operations to cause the device to transition to the reduced-power state, including generating power control signals to remove power from device components, generating commands to cause the operating system to transfer data between volatile and non-volatile memory; and causing the device to reboot the operating system.

19. The apparatus of claim 11, wherein the device is a processor-based device.

20. The apparatus of claim 19, wherein the device is a personal data assistant.

21. A device implementing power conservation states and a calendar-scheduler that records calendar-based events and associated time-of-occurrences, comprising:
   means for detecting indications of device inactivity;
   means for transmitting, in response to the indication, a request for a time-of-occurrence for a calendar-based event;
   means for receiving, in response to the request, a time-of-occurrence for a calendar-based event; and
   means for determining, based on the received time-of-occurrence, a maximum duration of time the device can remain in a reduced-power state while insuring the device can perform operations associated with the calendar-based event when that event occurs.

22. The device of claim 21, wherein the determining means further comprises:
   means for determining a time at which the device is to transition from the reduced-power state to an operational state to perform the operations associated with the calendar-based event to be a time prior to the calendar-based event's time-of-occurrence.

23. The device of claim 21, wherein the determining means comprises:
   means for receiving a time duration required for the device to transition from the reduced-power state to the operational state.

24. The device of claim 23, wherein the determining means further comprises:
   means for determining a time at which the device is to transition from the reduced-power state to an operational state to perform the operations associated with the calendar-based event to be a time prior to the calendar-based event's time-of-occurrence less the time duration required for the device to transition from the reduced-power state to the operational state.

25. The device of claim 21, further comprising;
   means for measuring periods of device inactivity;
   wherein the determining means comprises means for determining whether the device is to be transitioned from the current state to the reduced-power state in response to the detecting means detecting a predetermined period of device inactivity.

26. The device of claim 21, further comprising:
   means for determining whether the device should be transitioned to the reduced-power state based on the determined time to transition from the reduced-power state to the operational state, and one or more factors comprising a difference between the determined time to transition from the reduced-power state to the operational state and the present time.

27. The device of claim 21, wherein the device is a processor-based device.

28. The device of claim 21, wherein the device is a personal data assistant.

29. An article of manufacture, comprising:
   a computer-readable volume storing computer-executable instructions, the instructions implementing a method for conserving power in a processor-based device implementing power conservation states and a calendar-scheduler that records calendar-based events and associated time-of-occurrences, the method comprising:
   detecting an indication regarding inactivity of the processor-based device;
   transmitting, in response to the indication, a request for a time-of-occurrence for a calendar-based event;
   receiving, in response to the request, a time-of-occurrence for a calendar-based event; and
   determining, based on the received time-of-occurrence, a maximum duration of time the device can remain in a reduced-power state while insuring the device can perform operations associated with the calendar-based event.

* * * * *

UNITED STATES PATENT AND TRADEMARK OFFICE
CERTIFICATE OF CORRECTION

| | | |
|---|---|---|
| PATENT NO. | : 7,100,062 B2 | Page 1 of 1 |
| APPLICATION NO. | : 10/352726 | |
| DATED | : August 29, 2006 | |
| INVENTOR(S) | : Ken Nicholas | |

It is certified that error appears in the above-identified patent and that said Letters Patent is hereby corrected as shown below:

In column 3, line 65, delete "is" before "commonly".

In column 14, line 6, in Claim 25, delete "comprising;" and insert -- comprising: --, therefor.

Signed and Sealed this

Seventeenth Day of March, 2009

JOHN DOLL
*Acting Director of the United States Patent and Trademark Office*